United States Patent [19]
Cook

[11] Patent Number: 5,324,187
[45] Date of Patent: Jun. 28, 1994

[54] CO-EXTRUSION APPARATUS

[76] Inventor: Warren R. Cook, 5611 Dogwood Dr., Jackson, Mich. 49201

[21] Appl. No.: 70,028

[22] Filed: Jun. 1, 1993

Related U.S. Application Data

[63] Continuation of Ser. No. 723,171, Jun. 28, 1991, abandoned.

[51] Int. Cl.$^5$ ............................................. B29C 47/12
[52] U.S. Cl. ................................. 425/131.1; 264/171; 425/133.5; 425/186; 425/192 R; 425/462; 425/DIG. 47
[58] Field of Search ............... 425/131.1, 190, 133.1, 425/133.5, 186, 192 R, 224, 467, 191, 462, DIG. 47; 264/171, 173

[56] References Cited

U.S. PATENT DOCUMENTS

| | | | |
|---|---|---|---|
| 3,308,508 | 3/1967 | Schrenk | 425/133.1 |
| 3,334,382 | 8/1967 | Lefevre | 425/133.1 |
| 3,404,432 | 10/1968 | White et al. | 425/133.1 |
| 3,477,099 | 12/1969 | Lee et al. | 425/133.5 |
| 3,528,130 | 9/1970 | Lefevre et al. | 425/133.1 |
| 3,959,432 | 5/1976 | Wiley | 264/171 |
| 4,152,387 | 5/1979 | Cloeren | 264/171 |
| 4,226,822 | 10/1980 | Yoshikawa et al. | 264/173 |
| 4,365,949 | 12/1982 | Nash | 264/173 |
| 4,484,877 | 11/1984 | Stucke et al. | 264/173 |
| 4,504,210 | 3/1985 | Titz et al. | 425/467 |
| 4,533,308 | 8/1985 | Cloeren | 425/131.1 |
| 4,578,025 | 3/1986 | Ando et al. | 425/133.1 |
| 4,657,497 | 4/1987 | Dehennau et al. | 425/133.1 |
| 4,708,615 | 11/1987 | Bethea et al. | 425/192 R |
| 4,770,618 | 9/1988 | Lupke | 425/224 |
| 4,808,098 | 2/1989 | Chan et al. | 425/133.1 |
| 4,846,648 | 7/1989 | Spence et al. | 425/133.1 |
| 5,046,938 | 10/1991 | Hirschberger | 425/133.1 |
| 5,069,612 | 12/1991 | Teutsch et al. | 425/133.1 |
| 5,108,682 | 4/1992 | Tompkins et al. | 425/133.1 |

Primary Examiner—Jay H. Woo
Assistant Examiner—Joseph Leyson
Attorney, Agent, or Firm—Beaman & Beaman

[57] ABSTRACT

The invention pertains to a system for the co-extrusion of multiple layers of thermoplastic material. The invention employs a modular system concept which enables a manufacturer to quickly exchange components to accept melt flow from a number of extrusion injectors to provide a number of extrudate layers for shaping by a standard sheet extruder die.

4 Claims, 3 Drawing Sheets

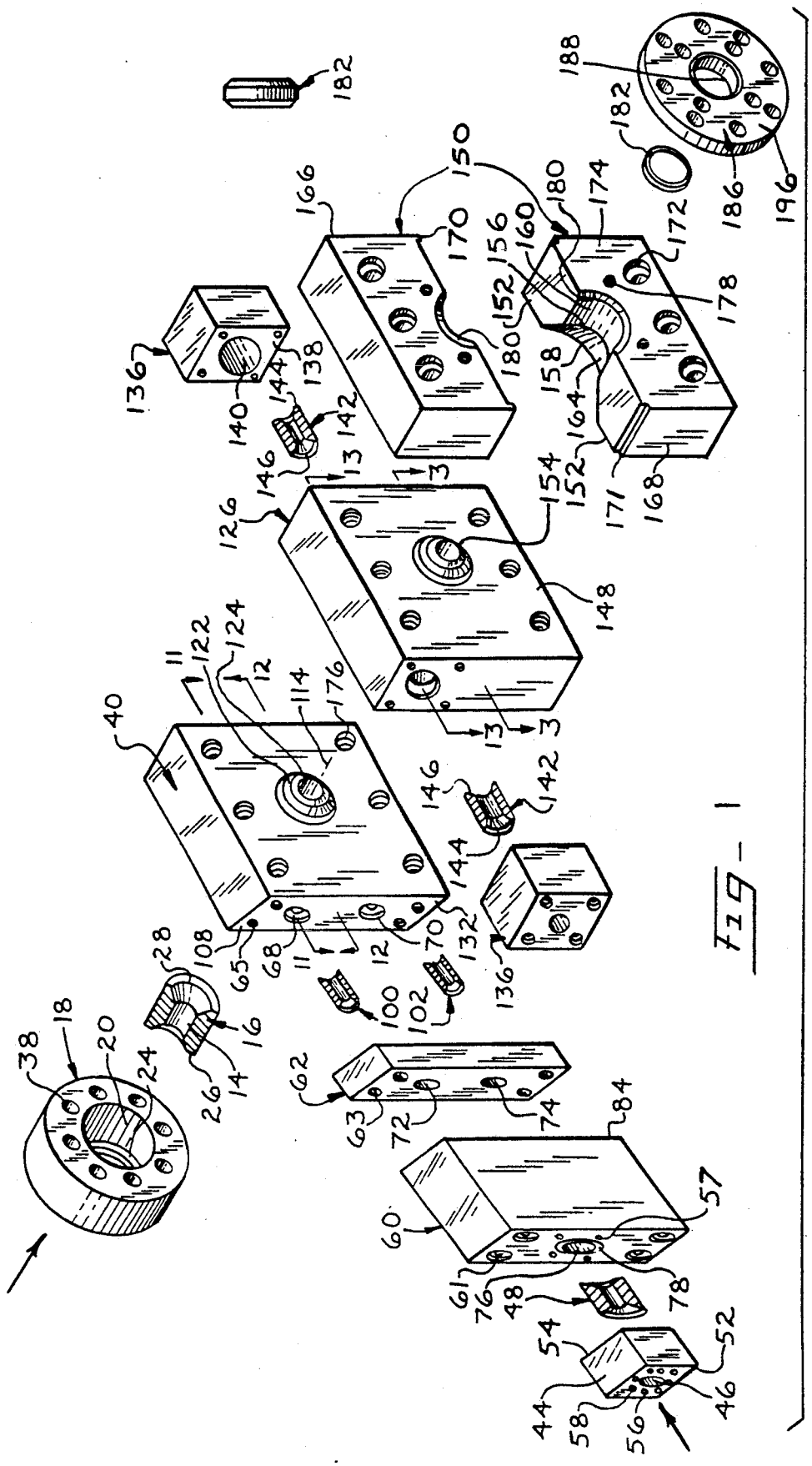

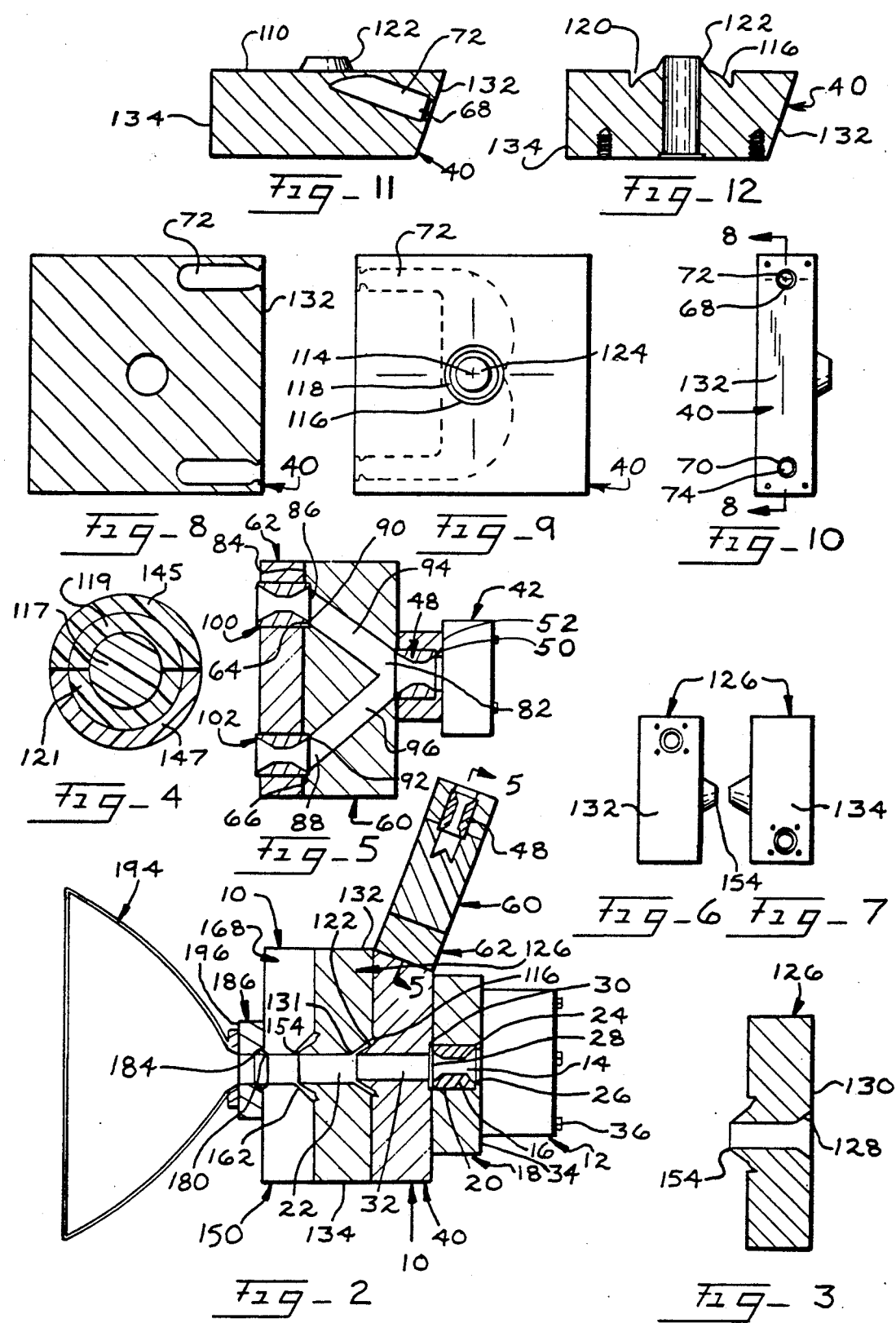

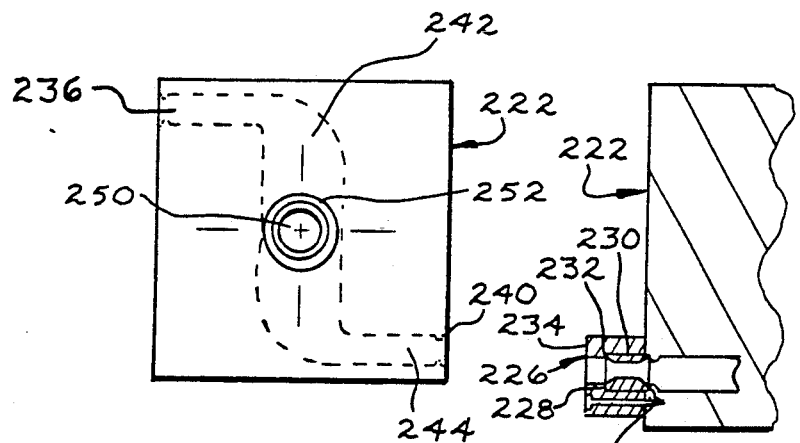
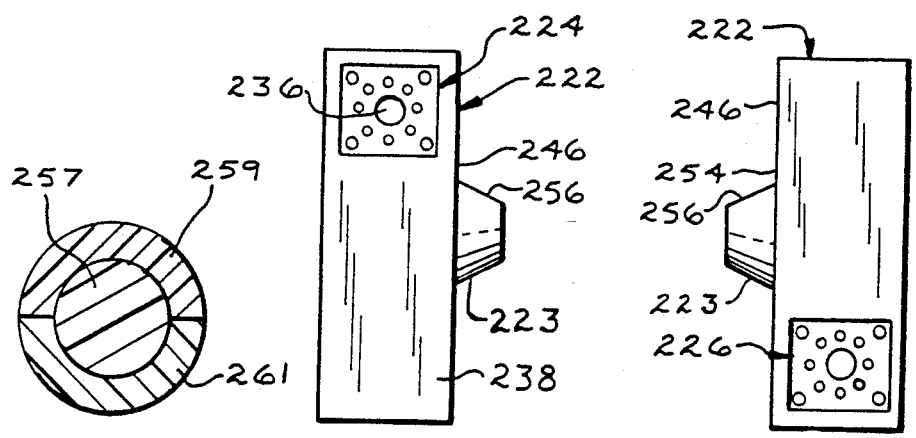
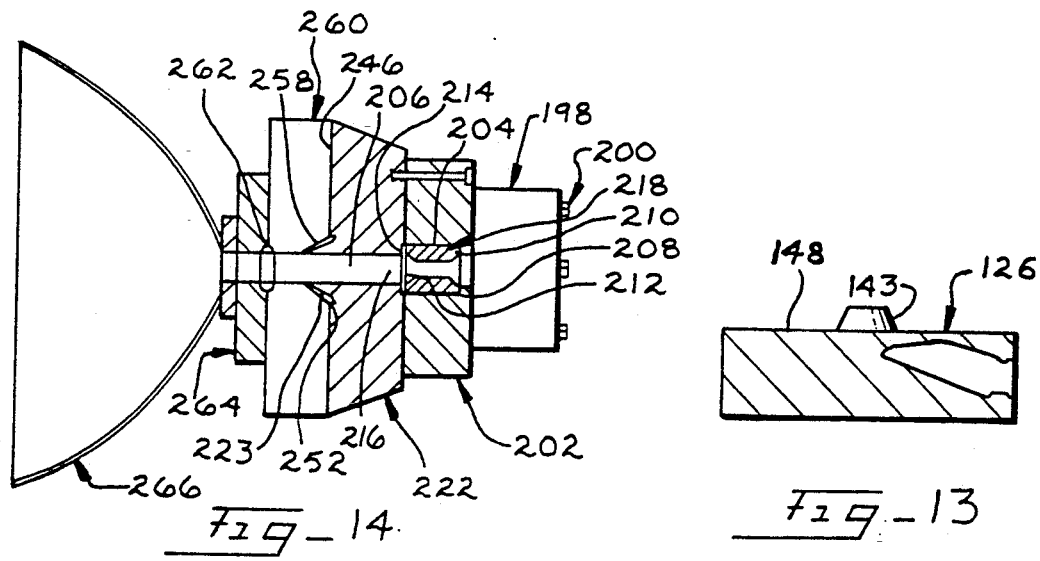

CO-EXTRUSION APPARATUS

This is a continuation of co-pending application Ser. No. 07/723,171, filed Jun. 28, 1991, now abandoned.

BACKGROUND OF THE INVENTION

1. Field of the Invention

The present application relates to a system for extruding multi-layer thermoplastic materials into sheets having selected layer thicknesses and more particularly to modular extrusion manifold systems.

2. Description of Related Art

The invention is concerned with the art of fixed area injection port plastic extruders for the manufacture of thermoplastic sheet or film. It is known in the art that many advantages are achieved by the production of multi-layer film constructions of thermoplastic materials as they exhibit characteristics which are a composite of all the individual layer characteristics. For instance, the inner layer may be of a material with high permeability resistance to chemicals, the next layer may be a pigmented layer followed by a layer which is very tough and a final layer may have an ultraviolet light inhibiter in it to protect the underlying structures from ultraviolet light. These layers are often melt laminated in a co-extrusion process which results in a very stable structure with extremely high delamination resistance. Where several products may be manufactured by a factory, a simple and economical means to vary the number of laminae and the relative thicknesses of each is required.

Fixed manifold dies are well known in the art, for instance the invention of U.S. Pat. No. 4,226,822 which teaches a five-layer film extrusion system. Extruders of fixed orifice size are often employed where, as in that invention's application, a very high degree of laminal thickness control is required. These fixed units become increasingly expensive to build because of their injection chamber configurations' complexity. Consequently, the configurations are generally application specific; relating to a specific combination of laminae and melt materials and are not readily adaptable to extrude sheets with different thermoplastic materials or diverse lamina thicknesses. Furthermore, as extrudate rheology or injection pressure vary during the period of a manufacturing run, it can be difficult to compensate for factors such as viscosity changes when using a fixed manifold system which may result in extrudate laminal thickness inconsistencies.

An example of a variable orifice size die is taught in U.S. Pat. Nos. 4,152,387 and 4,533,308. Dies of these configurations utilize a vane system which directs flow and adjusts lamina thickness, within limits, without requiring a die exchange. Similarly, the system provides for adjustment to accommodate diverse melt rheologies. The inherent disadvantage of such systems lays in the need to experimentally determine the flow distribution settings after each changeover which results in a loss of production capacity. Production capacity is important because high production capacity is the primary advantage of extrusion systems over other thermoplastic production techniques.

Extrudate laminal uniformity is also critical and those factors related to melt flow characteristics which result in diverse flow rates among the passages can cause a curtaining effect, well known in the art, whereby waves occur in the finished sheet due to variations in the passage flow rates. Another effect which has been observed is that there exists a pressure gradient across a melt flow such that the pressure at the center of the flow is greater than that at each extreme edge of the flow. This causes increased melt deposition in the center of the sheet being extruded and a corresponding thinning at the sheet edges which results in a non-uniform extrudate.

The curtaining effect is a result of the convergence of molten thermoplastic streams at diverse flow rates. Many attempts have been made in the art to come to terms with the curtaining effect phenomenon. In configurations of the invention principles of U.S. Pat. Nos. 4,533,308 and 4,152,387, compensation is accomplished by shutting down the extruder and changing the metering vane to one of an appropriate configuration with resultant loss in production time as new settings are experimentally determined.

Conventional machines of this type have also the disadvantage that the vane configurations are inherently weaker than the more rigid structures of fixed manifold systems; such strength being necessary to withstand variations in melt passage pressures which can cause the vane to deflect. Furthermore, the long manifold channel lengths limit the flow rate of the melts thereby placing an inherent limitation on the attainable production capacities in systems using dies of their construction.

OBJECTS OF THE INVENTION

In view of the foregoing it is the aim of the invention to achieve the following objects either singly or in combination. It is an object of the invention to provide a co-extrusion system capable of quick changeovers to minimize production line down time.

It is also an objective of the invention to provide for enhanced melt flow control in a co-extrusion system to more accurately maintain the desired extrudate laminal thicknesses so that a uniform product can be fabricated.

Another object of the invention is to provide a co-extrusion die which minimizes the curtaining effect to minimize the laminal rippling effect which results from differences in interlaminal deposition rates.

Additional objects, advantages and novel features of the present invention are set forth in the description that follows, and in part will become apparent to those skilled in the art upon examination of the following description or may be learned by practice of the invention.

SUMMARY OF THE INVENTION

To achieve the foregoing objects and in accordance with the purpose of the present invention, as embodied and broadly described herein, there is provided a multi-ported manifold extruder for multi-laminal extrusions which is particularly suited to quick changeover to produce a diversity of products under a variety of operating conditions and utilizing various extrudable materials. This is accomplished by using fixed modules which have been previously adapted to provide optimum extrudation performance under a variety of anticipated conditions.

The invention features a central primary passage having a low resistance to molten plastic flow which longitudinally extends through the inlet block along the central axis, and through which travels the primary molten plastic flow which exits in the inlet block outlet through a convergence cone. The inlet block may be configured to deposit one or two layers of satellite extrudable material circumferentially about the primary flow; the satellite flow entering the inlet block satellite flow passage, traversing the inlet block and exiting through a concentric plenum opening outside the convergence cone circumference. This satellite flow is forced between the convergence cone outer wall and a complimentary frustoconical structure in the block following the inlet block.

The block following the inlet block may be a cover coat block which controls the deposition of the satellite layer or layers, or it may be an intermediate block which in turn deposes one or two additional layers; in which case, the intermediate block may be followed by additional intermediate blocks or a cover coat block. Enhanced production performance is achieved through low melt passage flow loss design achieved through optimization of flow passage dimensions, minimization of flow direction changes and the employment of large radius sweeps, where flow direction changes are required, to enhance the capacity of the manifold system.

Each melt passage flow rate is balanced through the use of orifices between an extruder injector and the primary, and satellite flow passages. The orifices are also designed such that when they are assembled they will form a tight seal minimizing the need for additional sealing components. The need for separate sealing components is similarly reduced by closely fitting the inlet block, itermediate block and cover coat block mating surfaces which also reduces the amount of time required for a production changeover. After the desired number of layers are deposited about the primary flow, the composite flow passes through a sealing ring, and then through an extrusion die adaptor block and finally through a standard extruder die for final shaping into the desired form.

In the drawings and in the detailed description of the invention that follows two preferred embodiments of the invention are described of the best mode for practicing the invention. As will be realized the very nature of the invention is such that other embodiments are anticipated as several features are capable of modification in various respects, all without departing from the principles of the invention. Accordingly, the drawing and detailed description are to be regarded as illustrative in nature, and not as being restrictive.

BRIEF DESCRIPTION OF THE DRAWINGS

In order that the invention may be clearly understood, it will now be described, by way of example, with reference to the accompanying drawings, wherein:

FIG. 1 is an exploded, partly in cross-section perspective view of the invention in a five layer embodiment, FIG. 2 is a plan view, partly in cross-section of the invention in a five layer embodiment, FIG. 3 is plan view cross-section of the invention intermediate block as taken along Section 3—3 of FIG. 1, FIG. 4 is a cross-sectional elevation view of the five layer extrudate as it would appear in the outlet end of the invention cover coat block in accord with the five layer extrusion embodiment described, FIG. 5 is a partly cross-sectional view of the invention satellite melt choke block, splitter block, and an injector adaptor block as taken along Section 5—5 of FIG. 2, FIG. 6 is a right side elevational view of the intermediate block of the invention showing the upper satellite flow inlet, FIG. 7 is a left side elevational view of the intermediate block showing the lower satellite flow inlet, FIG. 8 is a cross-sectional elevation view of the inlet block as taken along Section 8—8 of FIG. 10, FIG. 9 is an elevational view of the invention inlet block showing with hidden lines the broad sweep of the satellite flow passages as they transform into the satellite outlet chambers as viewed from the outlet end, FIG. 10 is an elevational side view of an inlet block showing the convergence cone in profile and the satellite inlets of an embodiment adapted to feed both satellite flows from the inlet block right side, FIG. 11 is a cross-sectional plan view as taken along Section 11—11 of FIG. 1, FIG. 12 is a cross-sectional plan view as taken along Section 12—12 of FIG. 1, FIG. 13 is a cross-sectional plan view of an intermediate block in accord with the invention principles as taken along a line through the center of the upper satellite inlet, FIG. 14 is a partly diametrical cross-section plan view of the invention in a three layer extrusion embodiment, FIG. 15 is a left side elevational view of the inlet block of the invention in the described three layer extrusion embodiment showing the lower passage injector adaptor block, FIG. 16 is a right side elevational view of the inlet block of the invention in the described three layer extrusion embodiment showing the lower passage injector adaptor block, FIG. 17 is an elevational cross-section of a three layer diverse material extrudate as it would appear in the outlet end of the cover coat block of a three layer extrusion embodiment in accord with the invention, FIG. 18 is a cross-sectional detail drawing of the invention in the described three layer extrusion embodiment showing the lower satellite flow inlet, and FIG. 19 is an elevational view of the invention in the described three layer extrusion embodiment illustrating the inlet block depicting the satellite flow passages broad sweep in hidden lines as they transform into the satellite outlet chambers as appreciated from the outlet end.

DESCRIPTION OF THE PREFERRED EMBODIMENTS

Describing the invention in detail with reference to the drawings, a five layer extrusion embodiment is shown in FIGS. 1 and 2, designated as 10, which illustrates the relationships between the various basic modules of the invention. The primary flow of molten plastic, which is to become the core of the extruded form, is introduced by the primary flow injector 12. This molten plastic leaves the primary flow injector 12 and enters the central passage 14 of the primary flow orifice 16 which is housed within the primary injector choke and adaptor block 18 having a central chamber 20. The orifice central passage demarcates the beginning of a primary melt flow passage 22 which extends through the centers of the various assembled aligned blocks.

The primary injector choke and adaptor block 18 defines the central chamber 20, in which an orifice seat 24 is machined into the chamber inlet end wall which is engaged by the primary flow orifice inlet end 26 when it is inserted into the central chamber 20. The orifice outlet end 28 similarly engages an orifice seat 30 defined in the inlet block primary flow passage inlet 32. The orifice 16 is selectively sized to regulate the primary melt flow and form a seal when the unit is assembled.

The sealing function of the primary flow orifice 16 and the other flow metering orifices used in the invention are similar. When the invention is assembled with the orifices in place, the orifice 16 acts as an alignment aid by serving as a dowel or location pin during assembly. As the assembly bolts are tightened, the orifice 16 is compressed between the two orifice seats 24 and 30 forming a seal on each end. This occurs because the orifice length is about 0.005 inches longer than the assembled distance between the two seats. The deformation of the heat treated 400 series stainless steel orifice is well within the material's elastic limit and therefore no permanent deformation of the orifice structure takes place upon compression. Also, because the orifices are less hard than the seating surfaces with which they come in contact, they do not mar the seating surfaces nor cause them to significantly deform. The employment of this sealing means eliminates the need for additional seals and, consequently, reduces the assembly cost as well as reducing the time necessary for changeover because of the orifice's operation as a component alignment aid.

The primary injector choke and adaptor block inlet end 34 has drilled and tapped holes which receive injector mounting bolts 36 which connect the injector 12 to the choke and adaptor block 18. Also defined in the primary choke and adapter block 18 are peripheral counter-bored holes 38 receiving cap screws, not shown, which pass through the primary injector choke and adapter block 18, and engage aligned, threaded holes in the inlet block, thereby connecting the choke and adapter block 18 and the injector 12 to the inlet block 40.

The inlet block 40 directs a satellite melt flow over the top and bottom of the primary melt which will later constitute layers of the extruded sheet. This material may be provided by either a single conventional injector 42 as in the five layer configuration shown, or by two inlet block satellite injectors which may be connected to the same side or on opposing sides of the inlet block 40. Even if the material of the top and bottom laminae are the same, separate satellite flow passages will enhance the laminal uniformity through reduction of the lamina end to end pressure gradient which can be responsible for non-uniform extrudate layer thickness.

These satellite injectors 42 may supply diverse materials which separately flow from the respective injectors, or as in the preferred embodiment shown in FIG. 5, from a common injector through a satellite flow injector adaptor block 44. The adaptor block 44 has a central chamber 46 which receives a satellite flow metering orifice 48 which cooperates with a adaptor block orifice seat 50 defined in the chamber inlet end 52. The satellite common flow orifice 48, in conjunction with other satellite flow orifices, and the primary flow orifice 16, balances the satellite passage flow rates to provide the desired laminae thicknesses. The adaptor blocks are securely connected by means of drilled, tapped holes 56 which receive injector mounting bolts 36 to secure the injector 42 to the adaptor 44. Each adaptor block also has drilled, counter-bored holes 58 to receive the heads of mounting bolts for securing the injector adaptor block 44 to a splitter block 60 through tapped holes 57, as in the illustrated preferred embodiment, or to an inlet block 40 if a splitter block 60 is not used such as in an application where the two lamina are of diverse materials. A choke block 62 is interposed between the inlet block 40, the splitter block 60 and the injector adaptor block 44 houses the satellite flow orifices 100,102 having ends 64 and 66, respectively, and acts as a spacer between the splitter block and the inlet block orifice seats 68,70. These blocks are connected by means of cap screws which pass through drilled, counter-bored holes 61 in the splitter block 60, through the choke block holes 63 and then into the drilled and threaded holes 65 in the inlet block.

A splitter block 60 is employed to divide the satellite flow passage into two equal passages, an upper satellite flow passage 72 and a lower satellite flow passage 74, both of which extend through the choke block 62 and into inlet block 40 which respectively supply the second and third lamina melts of a five layer extrudate. The inlet 76 of the splitter block 60 has a counter-bored orifice seat 78, which, together with the common satellite melt flow orifice 48 and the injector adaptor orifice seat 50 define the common satellite flow passage 82 between the splitter block 60 and the injector 42. The splitter block outlet end 84 defines an upper outlet port 86 and a lower outlet port 88, the upper port having a counter-bored passage flow orifice seat 90 receiving flow orifice end 64 and the lower port having a counter-bored passage flow orifice seat 92 receiving flow orifice end. While the upper branch 94 of the splitter block 60 and the lower branch 96 of the splitter block 60 each may be sized to be one half the cross-sectional area of the splitter block inlet 76, the invention object of minimizing flow losses in order to maximize the extrusion rate is better served by using a larger flow passage. Consequently, it is preferred that each branch and subsequent passage be substantially the same size as the inlet port cross-sectional area. This feature also simplifies the machining of the passage branches within the splitter block.

As can be appreciated from FIG. 5, the splitter block 60 outlet port orifice seats receive an upper flow passage orifice 100 and a lower flow passage orifice 102, each sized to provide flow rates proportional to the deposition rate required for the desired thickness of each resulting lamina. These orifices are housed in a choke block 62 and communicate with the upper passage 72 and the lower passage 74 of the block 40. The upper orifice 100 is received by a complementary counter-bored seat 68 defined in the inlet block upper satellite melt passage's inlet, and the lower orifice 102 is received by a complementary seat 70 defined in the inlet block lower satellite melt passage's inlet.

The object of the invention to minimize the flow resistance and thereby maximize the extrusion rate is further served by angling the satellite flow inlet end 108 20° towards the inlet block outlet end centerline, as shown in FIG. 11, to reduce the need for a passage directional change which can result in turbulence and increased frictional losses. In an embodiment wherein the satellite flow is from both sides, each would be similarly angled with respect to the outlet end, as in the embodiment shown by FIG. 14, to minimize passage losses. The object of minimizing flow losses and consequently maximizing throughput is further realized by the selection of a large inner passage in combination with the contour of the plenum transition within the inlet block as can be further appreciated by studying FIGS. 8 through 12. For the sake of conciseness, the following discussion will mainly be directed to the upper satellite melt flow passage 72. With the exception of the upward sweep of the lower satellite melt flow passage 74, as opposed to the downward sweep of the upper passage 72, a similar description applies to the mirror image lower flow passage 74.

As can be appreciated by reference to FIG. 8, the upper inlet block satellite melt flow passage 72 and lower satellite melt flow passage 74 have inlet portions which are cylindrically shaped and open up behind their respective orifice seats 68,70 to reduce frictional losses within the inlet block satellite flow passages. The inlet portion of the upper passage 72 transversely extends at substantially a 20° angle towards the inlet block outlet end 110 until the inlet block central longitudinal vertical plane is reached at which point an outlet portion of the passage 72 begins which sweep downward in a convex arc with a 90° deviation with respect to the inlet portion toward the inlet block central axis 114 at a radius about three times the radius of the transverse inlet portion of the satellite flow passage 72 in order to minimize the melt flow resistance resulting from the directional change.

The inner wall 116 of the satellite melt outlet chamber is defined in the inlet block beginning at the intersection of the satellite melt flow passages 72,74 with the inlet block central longitudinal vertical plane where they continue in a convex arc toward the inlet block satellite flow outlet 118 as can be appreciated by FIGS. 8, 9, 11 and 12. The satellite flow sweeps downward into the outlet chamber 120 formed between the inner wall 116 and the portion 128 of the central composite melt flow passage of the block 126 where it is redirected to flow in a coaxial cylindrical mass from the satellite flow outlet 118 and along a convergence cone outer surface 122. The primary melt flow 117, the intermediate block upper passage satellite melt flow 119 and the inlet block lower satellite melt flow 121 meet and melt fuse at the convergence cone outlet end 124. Subsequent forming of the melt emitting from the inlet block is accomplished by the inlet configuration of the intermediate block 126.

As can be best appreciated by reference to FIG. 3, the intermediate block 126 has a central composite melt flow passage having two portions, the first of which, 128, intersects the inlet end 130 and is a substantially frustoconical shape extending inward towards the intermediate block central axis adapted to receive the inlet block convergence cone outer surface 122 and the combined primary melt flow and satellite flows therefrom. The first portion 128 extends approximately one-third of the intermediate block thickness and the point where the convergence cone end 124 is closest to the intermediate block first part 128 forms a metering point 131 for the satellite flows. This metering point can be modified to provide the desired coat deposition by shaping the first portion 128 and/or the convergence cone end to compensate for deposition variances resulting from side to side pressure gradients along the convergence cone outer surface 122.

As with the satellite melt flows of the inlet block, the intermediate block satellite material is introduced through the use of satellite injectors, not shown, connected to injector adaptor blocks. In the embodiment of FIG. 1, the left side injector would be bolted to an adaptor block 136 which has a central opening communicating with and in alignment with the injector's outlet, not shown, and receiving melted plastic. The adaptor block outlet end 138 defines a chamber 140 adapted to receive a satellite flow metering orifice 142 which mates with a complementary orifice seat defined in that chamber's inlet end. The orifice design is similar to that of the satellite configuration previously described in conjunction with the inlet block 40. The orifice comprises a high temperature seal when the orifice inlet end 144 mates with the injector adaptor seat and its outlet end 146 mates with a seat defined in the intermediate block left side satellite melt inlet.

As with the inlet block 40, the invention anticipates that the block can be fabricated such that a satellite flow can be directed from either side of the block as the application requirements may dictate. For the purposes of orientation, the invention right side has been designated 132 and the invention left side has been designated 134, the sides being defined in relation to the direction of the extrudate mass flow. In this embodiment, the upper flow is directed from the right side 132 and the bottom flow is supplied from the left side 134. Unlike the previously described inlet block 40 which has the satellite flow inlet portion angled inward at a 20° angle relative to the outlet end plane perpendicular, the intermediate block in the illustrated embodiment is rectangular. Because the sides are perpendicular to the inlet and outlet ends, the passage must be angled inward toward the outlet end at substantially a 20° angle. While this is less preferable than the angled side configuration of the inlet block previously described, due to the losses which are incurred when the flow changes direction, the equipment mounting requirements often dictate this configuration.

As in the satellite passage design of the inlet block 40, in order to minimize frictional losses in the satellite passages, the intermediate block satellite passage cross-sectional areas are enlarged behind the satellite flow orifice seat where the passage is then angled 20° toward the outlet end. The cylindrical passage continues from that point in a straight line until the passage is swept in a radius substantially three times that of the cylindrical passage into the outlet chamber. The satellite flow passage sweeps downward in a convex arc to describe the outlet chamber where the satellite melt is redirected to flow in a substantially cylindrical mass from the outlet end and along a convergence cone outer surface 143 which shapes the satellite flow, the intermediate block upper satellite melt flow 145 forming a layer over the inlet block upper passage layer 119 and the lower intermediate block melt flow passage depositing a layer 147 over the inlet block lower layer 121. As in the previously described example of the inlet block, the large outlet chamber sweep radius contributes to the characteristically low frictional losses of the invention. The extrudate emerging from the intermediate block outlet end 148 is further formed with a two piece cover coat block 150 which is mounted thereon.

The cover coat block inlet end 152 and the intermediate block outlet 148 are complementarily machined to close tolerances to provide parallel mating surfaces which form an effective seal thereby eliminating the need for an expensive high temperature seal material intermediate the surfaces. Furthermore, the elimination of the separate seal reduces turbulence in the melt flow passage and simplifies assembly for die changeover because the old sealing material need not be removed and the surfaces prepared for reassembly.

A central flow passage 156 is defined in the cover coat block 150 coaxially, radially extending from the cover coat block central axis in alignment with the primary flow passage 32 of the inlet block 40 and the primary flow passage of the intermediate block. The extrudate passes through the cover coat block 150 two portions from the inlet end 152; the first portion 158 being a substantially frustoconical chamber extending away from the intermediate block outlet end 148 tapering toward the cover coat block central axis a distance substantially equal to one-half the depth of the cover coat block 150 at which point the second portion 160 starts.

The first portion 158 directs the satellite flow inwardly towards the central axis until it merges with the primary flow thereby forming a composite mass that passes into a second portion 160. The outer layers deposited by the previous stage are evenly distributed by means of the customized shaping of the intermediate block convergence cone end 154 and the cover coat block first portion 158 which together comprise a metering point 162. For instance, the center of the cover coat block frustoconical first portion 164 can be shaped by selective removal of metal to locally increase the gap between the cover coat block and the intermediate block convergence cone to compensate for a pressure buildup at that point which otherwise would cause a thinning of the extrudate layer at that point. Similarly, the end of the convergence cone of the previous stage can be cut back to increase the amount of outer melt deposited at a given point.

The cover coat block second portion 160 is an elongated cylinder extending from the first portion terminus away from the inlet block and having a diameter substantially equal to that of the inlet block primary flow passage 22. The primary flow volume flow rate is reduced by the convergence of the outer flow at the metering point 162, defined by the end of the convergence cone and the adjacent point on the cover coat first part cone. Consequently, at the beginning of the second portion both flows are moving at the same speed thereby ensuring proper deposition of the outer layers.

The cover coat block 150 is comprised of a upper unit 166 and a lower unit 168 to allow selection of a cover coat unit appropriate for the specific laminal extrudate rheology. The lower unit is aligned with the outlet end of the intermediate block by means of two locator pins installed in holes spaced symmetrically, one on each side of the cover coat block centerline. Alignment of the two units is facilitated by a pair of tongues 170 projecting from the upper part bottom which mate with a pair of complementarily machined grooves 171 in the lower part. The cover coat block 150 features a plurality of spaced, drilled and counter bored holes 172 from the cover coat outlet end 174 to receive cap screws, not shown, which pass through any existing intermediate blocks and engage with the aligned, threaded bolt holes 176 of the inlet block. Additionally, spaced, threaded bolt holes 178 are defined in the cover coat block outlet end 174 to receive extruder die adaptor bolts.

Defined on the cover coat block outlet end 174 is a sealing ring seat 180 which extends radially from the primary flow passage on the outlet end 174 where the primary flow passage intersects the outlet end. A sealing ring 182 engages the cover coat outlet sealing ring seat 180 as well as the complimentary sealing ring seat 184 defined in the extruder die adaptor block inlet 188.

The sealing ring is fabricated of a material such as type 304 stainless steel which is corrosion resistant and has a hardness less than that of the seat material so that the seats are not damaged by the ring. The sealing ring has a 30° taper on each end to facilitate engagement with the respective seats during assembly by acting as a dowel. During installation, the sealing ring is coaxially aligned with the extrudate flow passage and the cover coat block and extruder die adaptor block are aligned and brought together and the connecting bolts inserted and threadingly engaged. As the extruder die adaptor block inlet end is drawn to the cover coat block outlet end 174 by the connecting bolts during assembly, the seal ring more fully engages the seats until it bottoms out.

Sealing takes place as the blocks are drawn together, when the seal ring deforms substantially thereby conforming to the chamber defined by the joining of the opposing seats and sealing the primary flow passage. Because the seal ring is fabricated of steel and seals immediately adjacent the primary flow passage no seal surface preparation is normally required for reassembly during a changeover; a new seal ring is simply aligned and inserted intermediate the cover coat block and the extruder die adaptor block and the connecting bolts installed and tightened. Thus the seal contributes to the invention economy and minimizes the downtime required for changeover.

The extruder die adaptor block 186 enables the invention to be used in conjunction with many existing injection systems. Rather than requiring a custom die, a standard sheet extruder die 194 is bolted to the adaptor block outlet end 196. This feature reduces the cost of the complete co-extrusion system, and facilitates quick changeover between die shapes for other production runs.

The melt distributions are illustrated in FIG. 4, resulting from the thermoplastic flow represented by the arrows and the satellite flows join with the primary flow passage to form a mass which has a core and a series of concentric semi-circles of satellite melt surrounding it. The deposition of satellite flows from the inlet block 40 form layers 119,121 and the intermediate block 126 flow forms layers 145,147 such that they respectively cover either the top 180° or the bottom 180° of the composite melt. The inlet cone of the following intermediate block or cover coat block is appropriately relieved to provide even pressure distribution across the laminal arc so that when finally shaped by the extruder die, only minimal wrap-around of laminal material will be present and yet complete cover coat coverage will have been accomplished.

FIGS. 14 through 19 illustrate a three-layer extrusion configuration the components of which are analogous to those in the previously described five-layer configuration. As ca be appreciated from FIG. 14, the three-layer extrusion configuration first block is the primary conventional flow injector 198 which is connected by bolts 200 to a primary injector choke and adaptor block 202 which defines a central chamber 204. A seat 208 is machined into the primary injector choke and adaptor block outlet end wall which is engaged by the primary flow orifice inlet end 210 when it is inserted into the chamber 204. The orifice outlet end 212 similarly engages an orifice seat 214 defined in the inlet block primary flow passage inlet 216. The orifice 218 is of the same design as those previously described and serves the same functions.

The primary choke and adaptor block inlet end has drilled an tapped holes which receive injector mounting bolts 200 which connect the injector 198 to the choke and adaptor block 202. Also defined in the primary choke and adaptor block 202 are peripheral counterbored holes 220 receiving cap screws, not shown, which pass through the primary injector choke and adaptor block 202 aligned holes, and engage the aligned, threaded holes in the inlet block, thereby connecting the choke and adaptor block 202 and the injector 198 to the inlet block 222 having convergence cone 223.

The illustrated three-layer configuration is supplied by two separate satellite injectors, not shown, connected to injector adaptor blocks 224,226, as described in connection with the five-layer embodiment, supplying diverse materials to the inlet block. The lower satellite inlet is typical of the satellite inlets and its inventive principles apply by analogy to the upper inlet port. Each adaptor block has a central chamber 228 which receives a satellite flow metering orifice 230 which mates with a seat 232 defined in the adaptor block chamber. The satellite flow orifice 230, in conjunction with the other satellite flow orifice and the primary flow orifice 218, balance the satellite passage flow rates to provide the desired extrudate lamina thickness. Each injector adaptor has mounting provisions similar to those described for its application in the five-layer configuration and reference can be made to the previous description for the invention principles.

As in the inlet block of the five layer configuration, previously discussed, the inlet block 222 directs the satellite melt flow for deposition over the primary melt. This material is provided by two separate injectors feeding opposite inlet block satellite inlet ends, each of which is angled as appreciated from FIG. 14 at 20° relative to an inlet block outlet face perpendicular. One satellite flow enters the inlet block through an upper passage inlet 236 on the inlet block right side 238. The upper passage is shaped similar to that of the corresponding passage of the previously described five-layer embodiment inlet block upper passage. The lower passage inlet is defined on the inlet block left side. The lower passage begins at the inlet block satellite orifice seat is cylindrically shaped and opens up behind its orifice seat 240 to reduce frictional losses within the inlet block satellite flow passage 244. Similar to the illustration of FIG. 9, the inlet portion of the lower passage 244 transversely extends at substantially a 20° angle towards the inlet block outlet end 246 until the inlet block central longitudinal plane is reached, at which point the outlet portion of the passage sweeps upward toward the inlet block central axis 250 at a radius about three times the radius of the transverse satellite flow passage in order to minimize the melt flow resistance as in the previously described embodiment.

The inner wall of the satellite outlet chamber similar to that illustrated in FIG. 9 is defined in the inlet block beginning at the intersection of the satellite melt flow passages with the inlet block longitudinal plane where they arcuately sweep toward the inlet block satellite flow outlet as depicted in the description of the five-layer embodiment, FIGS. 9 and 12. The satellite flow sweeps in a downward convex arc describing the outlet chamber 252 formed between the inner wall and the portion 258 of the block 260 where it is redirected to flow in a coaxial cylindrical mass from the inlet block outlet end 254, along the convergence cone outer surface 256.

The cover coat block first portion 258 directs the satellite flow inwardly toward the central axis until the melt flow merges with the primary flow. When merged, the primary melt 257 top is covered with the upper satellite melt 259, and its bottom is covered by the lower satellite melt 261, FIG. 17. From that point, the invention cover coat block 260, sealing ring 262, extruder die adaptor 264 and extruder die 266 function as previously described.

As the flows progress through the invention heat losses could cause the plastic to set. To prevent this, as is normal practice in the art, each block is provided with several heater chambers, not claimed nor illustrated, with core heaters, not shown, installed to maintain the proper laminal temperature thereby ensuring a good melt bond between laminae.

The invention focus is on adaptability. The invention modules can be combined to deposit numerous additional layers over the previous layers as desired. Also, the inlet block 40, of the five-layer embodiment and intermediate block 126 of the same can be economically adapted to accommodate either right side or left side satellite injector mounting, or the upper passage may be fed from one side and the lower side may be fed from the other. It is anticipated that each of these combinations and others will be employed in the practice of the invention. While several embodiments of the invention have been presented for illustration, it is appreciated that various modifications to the inventive concepts may be apparent to those skilled in the art without departing from the spirit and scope of the invention. This description anticipates them and does not preclude their adoption.

I claim:

1. An apparatus for the co-extrusion of thermoplastics comprising, in combination, an inlet block having an axial passage defining an axial flow passage having an inlet and a conical outlet defined by a conical outer surface and said inlet block having a first side laterally located with respect to said axial passage, first and second satellite flow passages defined in said inlet block having first and second inlet portions, respectively, extending through said first side, said inlet portions having equal radii, said satellite flow passages including a common outlet in communication with said inlet block conical outlet, said inlet portions being inclined in the direction of thermoplastic flow through said axial flow passage and extending to respective outlet portions of the satellite flow passages, said outer portions sweeping in a convex arc with a 90° deviation with respect to the inlet portions at a radius three times the radius of said satellite's flow passage's inlets, a splitter block removably attached to said inlet block first side having first and second outlet ports in communication with said inlet block flow passage's first and second inlet portions, respectively, an inlet port defined in said splitter block a splitter passage defined in said splitter block establishing communication between said inlet port and both of said outlet ports, said inlet port being in communication with a thermoplastic injector, a two-piece cover coat block having a flow passage in communication with said inlet block conical outlet, said cover coat block including interconnectable first and second halves joinable at flat surfaces, one-half of a flow passage being defined on each half flat surface and said halves, defining the cover coat block flow passage when joined, and an extruder die adaptor block having a flow passage removably attached to said joined cover coat block halves whereby said cover coat block halves flow passage is coaxially aligned with and in communication with said die adaptor block flow passage.

2. The apparatus for the co-extrusion of thermoplastics as in claim 1, wherein said cover coat block flow passage having an outlet, a first seal ring annular recess defined on said cover coat block halves at said cover coat block flow passage outlet concentric thereto, said extruder die adaptor block flow passage having an inlet disposed toward said cover coat block outlet, a second seal ring annular recess defined in said extruder die adaptor block inlet concentric thereto, and an annular metal seal ring having end edges received within said first seal ring recess and said second seal ring recess being of a hardness less than the hardness of said cover coat block halves and said extruder die adaptor block whereby upon assembling said cover coat block and said extruder die adaptor block said seal ring is compressed and deformed within said seal ring recesses to form an effective metal-to-metal sealing to seal said cover coat block halves with respect to said extruder die adaptor block.

3. The apparatus for the co-extrusion of thermoplastics as in claim 2, wherein said sealing ring end edges being formed with a beveled configuration for facilitating alignment of said sealing ring with said associated first seal ring recess and said second seal ring recess, said recesses being of sufficient axial depth wherein said seal ring functions as a dowel to aid and maintain alignment of said flow passages of said cover coat block and said extruder die adaptor block.

4. An apparatus for the co-extrusion of thermoplastics comprising, in combination, an inlet block having an axial passage defining an axial flow passage having an inlet and a conical outlet defined by a conical outer surface and said inlet block having a first side laterally located with respect to said axial passage, first and second satellite flow passages defined in said inlet block having first and second inlet portions, respectively, extending through said first side, said inlet portions having equal radii, said flow passages including a common outlet in communication with said inlet block conical outlet, said inlet portions being inclined in the direction of thermoplastic flow through said axial flow passage and extending to respective outer portions of the satellite flow passages, said outer portions sweeping in a convex arc with a 90° deviation with respect tot he inlet portions at a radius three times the radius of said satellite flow passage inlet portions, said satellite flow passages intersecting said inlet block conical outlet on diametrically opposed sides of said inlet block conical outlet.

* * * * *